United States Patent
Hiraiwa et al.

(10) Patent No.: US 12,159,728 B2
(45) Date of Patent: Dec. 3, 2024

(54) LIGHT WATER REACTOR FUEL ASSEMBLY, LIGHT WATER REACTOR CORE AND MOX FUEL ASSEMBLY PRODUCTION METHOD

(71) Applicant: Kabushiki Kaisha Toshiba, Minato-ku (JP)

(72) Inventors: Kouji Hiraiwa, Chigasaki (JP); Rei Kimura, Setagaya (JP); Shungo Sakurai, Yokohama (JP); Rie Aizawa, Yokohama (JP); Goro Yanase, Yokohama (JP); Shinichiro Kawamura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 18/219,216

(22) Filed: Jul. 7, 2023

(65) Prior Publication Data

US 2024/0105350 A1 Mar. 28, 2024

Related U.S. Application Data

(62) Division of application No. 15/715,936, filed on Sep. 26, 2017.

(30) Foreign Application Priority Data

Sep. 26, 2016 (JP) .................. 2016-186540
Aug. 24, 2017 (JP) .................. 2017-160845

(51) Int. Cl.
  *G21C 3/326* (2006.01)
  *G21C 3/328* (2006.01)
  (Continued)

(52) U.S. Cl.
  CPC ............ *G21C 3/328* (2013.01); *G21C 3/326* (2013.01); *G21C 3/623* (2013.01); *G21C 21/02* (2013.01); *G21C 3/3262* (2019.01); *Y02E 30/30* (2013.01)

(58) Field of Classification Search
  None
  See application file for complete search history.

(56) References Cited

U.S. PATENT DOCUMENTS 3,252,867 A     5/1966   Conley
3,849,248 A  *  11/1974  Channon ............... G21C 7/04
                                            376/419

(Continued)

FOREIGN PATENT DOCUMENTS

JP    58-068692    4/1983
JP    58-223092   12/1983

(Continued)

OTHER PUBLICATIONS

Nuclear Power Handbook, 1st Edition, p. 341, Mar. 30, 1988, Ohmsha (5 Pages).

(Continued)

*Primary Examiner* — Lily C Garner
(74) *Attorney, Agent, or Firm* — Oblon, McClelland, Maier & Neustadt, L.L.P.

(57) ABSTRACT

A method of producing a light water reactor fuel assembly may include: setting conditions at least concerning an operation cycle period and burnup; setting an initial enrichment of enriched uranium; calculating excess reactivity of a light water reactor core where light water reactor fuel assemblies including the enriched uranium are burned until an end stage of a final operation cycle; determining whether a condition where excess reactivity at an end of a first operation cycle in the burnup calculation step is close to a predetermined positive value is true or not; and returning to the setting of the initial enrichment, when it is determined at the determining that the situation is not true, or deciding an enrichment of the enriched uranium when it is determined that the situation is true.

6 Claims, 15 Drawing Sheets

|  | Present embodiment | Comparative example |
|---|---|---|
| Uranium enrichment (%) | 4.8 | 3.8 |
| Concentration of burnable poison (%) | 5.5 | 4.0 |
| 1-cycle operation periods (months) | 13 | 13 |
| Average discharge burnup (GWd/t) | 45 | 45 |
| Burnup at the end of first cycle (GWd/t) | 10.4 | 10.4 |
| excess reactivity (%Δk) | > 0 | 0.0 |

(51) Int. Cl.
*G21C 3/62* (2006.01)
*G21C 21/02* (2006.01)

(56) References Cited

U.S. PATENT DOCUMENTS

| | | | |
|---|---|---|---|
| 4,493,814 A | 1/1985 | Beard, Jr. et al. | |
| 4,683,113 A | 7/1987 | Mochida et al. | |
| 4,879,086 A | 11/1989 | Luce et al. | |
| 5,008,070 A * | 4/1991 | Aoyama | G21C 3/326 |
| | | | 376/419 |
| 5,093,070 A | 3/1992 | Koyama et al. | |
| 5,192,496 A | 3/1993 | Soneda et al. | |
| 5,198,186 A | 3/1993 | Ogiya et al. | |
| 5,388,132 A | 2/1995 | Aoyama et al. | |
| 5,544,211 A | 8/1996 | Haikawa et al. | |
| 6,445,759 B1 | 9/2002 | Hiraiwa et al. | |
| 7,887,767 B2 | 2/2011 | Baron et al. | |
| 8,116,423 B2 | 2/2012 | Bashkirtsev et al. | |
| 8,582,713 B2 | 11/2013 | Kropaczek et al. | |
| 8,654,917 B2 | 2/2014 | Bashkirtsev et al. | |
| 8,842,802 B2 | 9/2014 | Russell, II et al. | |
| 8,953,736 B2 | 2/2015 | Reese et al. | |
| 9,293,228 B2 | 3/2016 | Stucker et al. | |
| 9,355,747 B2 | 5/2016 | Bashkirtsev et al. | |
| 10,037,823 B2 | 7/2018 | Bashkirtsev et al. | |
| 10,170,207 B2 | 1/2019 | Bashkirtsev et al. | |
| 10,192,644 B2 | 1/2019 | Totemeier et al. | |
| 2009/0028284 A1 | 1/2009 | Watanabe et al. | |
| 2011/0080987 A1* | 4/2011 | Watanabe | G21C 21/02 |
| | | | 252/643 |
| 2011/0164713 A1* | 7/2011 | Ahlfeld | G21C 1/024 |
| | | | 376/219 |
| 2014/0064433 A1 | 3/2014 | Nakadozono et al. | |
| 2014/0133619 A1 | 5/2014 | Bilovsky | |
| 2018/0254111 A1 | 9/2018 | Bashkirtsev et al. | |
| 2019/0139653 A1 | 5/2019 | Bashkirtsev et al. | |

FOREIGN PATENT DOCUMENTS

| | | |
|---|---|---|
| JP | 06-011585 | 1/1994 |
| JP | 2804205 | 9/1998 |
| JP | 2003-185775 A | 7/2003 |
| JP | 3960572 | 8/2007 |
| JP | 2010-151573 | 7/2010 |
| JP | 2012-137308 | 7/2012 |
| JP | 2012-137308 A | 7/2012 |
| JP | 5743518 | 7/2015 |
| KR | 91-3800 B1 | 6/1991 |
| KR | 10-2011-0105384 A | 9/2011 |
| KR | 10-1290842 B1 | 7/2013 |
| RU | 2 128 864 C1 | 4/1999 |
| RU | 2 172 029 C2 | 2/2000 |
| RU | 2 431 896 C2 | 10/2011 |
| WO | WO 9620484 A1 | 7/1996 |
| WO | WO 2014/088461 A1 | 6/2014 |

OTHER PUBLICATIONS

"Behavior of light water reactor fuel," 4$^{th}$ Edition, p. 33, Jul. 1998; Nuclear Safety Research Association (3 Pages).

Nuclear Power Handbook, 1st Edition ,p. 343, Mar. 30, 1988, Ohmsha (5 Pages).

Kenji Nishihara "Data for Estimating Potential Radiotoxicity of Spent Nuclear Fuel," p. 16, JAEA-Date/Code 2010-012, Sep. 2010, Japan Atomic Energy Agency (2 Pages).

G. Youinou, et al., "Plutonium Management and MultiRecycling in LWRs Using an Enriched Uranium Support," Global, '99, 1999, Table 1 (8 Pages).

Yu. S. Fedorov, et al., "Multiple Recycle of Remix Fuel Based on Reprocessed Uranium and Plutonium Mixture in Thermal Reactors," International Conference on Spent Fuel Management Jun. 15-19, 2015 in Vienna, Austria, aural presentation p. 4 (13 Pages).

Combined Russian Office Action and Search Report issued Jun. 6, 2018 in Russian Patent Application No. 2017133222 (with English translation), 15 pages.

Nuclear Regulatory Commission (NRC) document. 10 CFR 50.68 Criticality accident requirements. 63 FR 63130, Nov. 12, 1998. < https://www.govinfo.gov/app/details/CFR-2004-title1 0-vol 1/CFR-2004-title 1 0-vol 1-sec50-68> (Year: 1998).

* cited by examiner

FIG. 4

|  | Present embodiment | Comparative example |
|---|---|---|
| Uranium enrichment (%) | 5.0 | 3.8 |
| Concentration of burnable poison (%) | 4.0 | 4.0 |
| 1-cycle operation periods (months) | 13 | 13 |
| Average discharge burnup (GWd/t) | 45 | 45 |
| Burnup at the end of first cycle (GWd/t) | 10.4 | 10.4 |
| excess reactivity (%Δk) | > 0 | 0.0 |

FIG. 14

|  | Present embodiment | Comparative example |
|---|---|---|
| Uranium enrichment (%) | 4.8 | 3.8 |
| Concentration of burnable poison (%) | 5.5 | 4.0 |
| 1-cycle operation periods (months) | 13 | 13 |
| Average discharge burnup (GWd/t) | 45 | 45 |
| Burnup at the end of first cycle (GWd/t) | 10.4 | 10.4 |
| excess reactivity (%Δk) | > 0 | 0.0 |

LIGHT WATER REACTOR FUEL ASSEMBLY, LIGHT WATER REACTOR CORE AND MOX FUEL ASSEMBLY PRODUCTION METHOD

CROSS-REFERENCE TO RELATED APPLICATIONS

This application is a division of U.S. application Ser. No. 15/715,936, filed on Sep. 26, 2017, and published as US 2018/0090233 A1, claiming the benefit of priority from Japanese Patent Application No. 2016-186540 filed on Sep. 26, 2016, and Japanese Patent Application No. 2017-160845 filed on Aug. 24, 2017, the entire contents of each of which are incorporated herein by reference.

FIELD

The embodiments of this invention relate to a light water reactor fuel assembly, a light water reactor core, and a MOX fuel assembly production method.

BACKGROUND

In general, as for a fuel of light water reactor and a core of light water reactor, the fuel is designed in such a way that excess reactivity comes to zero at the end of one operation cycle (which is referred to as EOC, or End of operation cycle). In such a manner, the nuclear reactor is operated.

In a boiling water reactor (referred to as BWR), the concentrations of burnable poison such as gadolinium oxide are adjusted in such a way that the neutron absorption capacity comes to zero at EOC.

In the case of an initial loading core that is a first operation cycle core of a BWR plant, there is an example in which the burnable poison of some of small-proportion fuels are burned to be left as residues intentionally at EOC and the remnants of fuel are used to make up for a shortage of excess reactivity so that the thermal properties of the core is improved.

In a pressurized water reactor (referred to as PWR), the concentrations of the boric acid in chemical shim are adjusted in such a way that the concentrations come to zero at EOC.

Enrichment of fissile material is adjusted according to a target discharge burnup (which is a synonym for achieved burnup, in this case) or other factors. A uselessly high level of enrichment is not used.

The spent fuel of the light water reactor includes uranium isotopes, plutonium isotopes, and minor actinides. These substances are toxic as they cause internal exposure. In some cases, potential radiotoxicity is used as an indicator to represent the degree of their toxicity. Among the minor actinides, curium-244 (referred to as Cm244) retains the highest toxicity until about 10 years after the reactor shutdown.

Some light water reactors use as fuel pellets each of which contains both of plutonium oxides and uranium oxides that are obtained as a result of reprocessing spent fuel from light water reactors. Another light water reactor uses mixed oxide fuel (MOX fuel) which contains a greater or nearly equal level of enriched uranium-235 in uranium oxides than that of natural uranium.

When using enriched uranium for a base material with a mixed oxide fuel, there is also an example which raises the degree of uranium enrichment of the base material a maximum of 17%, and it uses repeatedly two or more times using the plutonium obtained by reprocessing the enriched uranium used with the light water reactor.

In nuclear fuel recycling, the above-mentioned light water reactor fuel elements and the fuel elements used in the light water reactor core are reprocessed after being discharged from the core. Through the reprocessing, uranium isotopes and plutonium isotopes are extracted for reuse, while minor actinides are disposed of as high-level radioactive waste. Since the minor actinides are highly toxic, especially toxic types of minor actinides are separated by a reprocessing method known as partitioning. The separated minor actinides are burned in a fast reactor after being added to MOX fuel; or the irradiation by an accelerator is conducted with the minor actinides as targets, thereby turning them into low-toxic nuclides. In this manner, the so-called partitioning and transmutation are considered.

If a once-through cycle is adopted instead of nuclear fuel recycling, the final disposal of spent fuel is carried out. Here, in the latter, such treatment as the above-mentioned separation and conversion is impossible.

In the former case, the separation and conversion requires advanced reprocessing technology, as well as dedicated fast reactors and accelerators. Another problem is that it takes long time and huge costs to develop and build the technology. In the latter case, the separation of minor actinides is not carried out, and the toxicity of the minor actinides is therefore not reduced. Therefore, the development of technology capable of reducing the toxicity without conducting the separation and conversion is desired.

BRIEF DESCRIPTION OF THE DRAWINGS

FIG. 4 is a comparison table on specifications of the present embodiment and comparative example showing conventional techniques.

FIG. 14 is a table of a comparison between specifications of light water reactor fuel assemblies of a third embodiment and those of normal uranium fuel assemblies of the comparative example.

DETAILED DESCRIPTION

Figure 1:
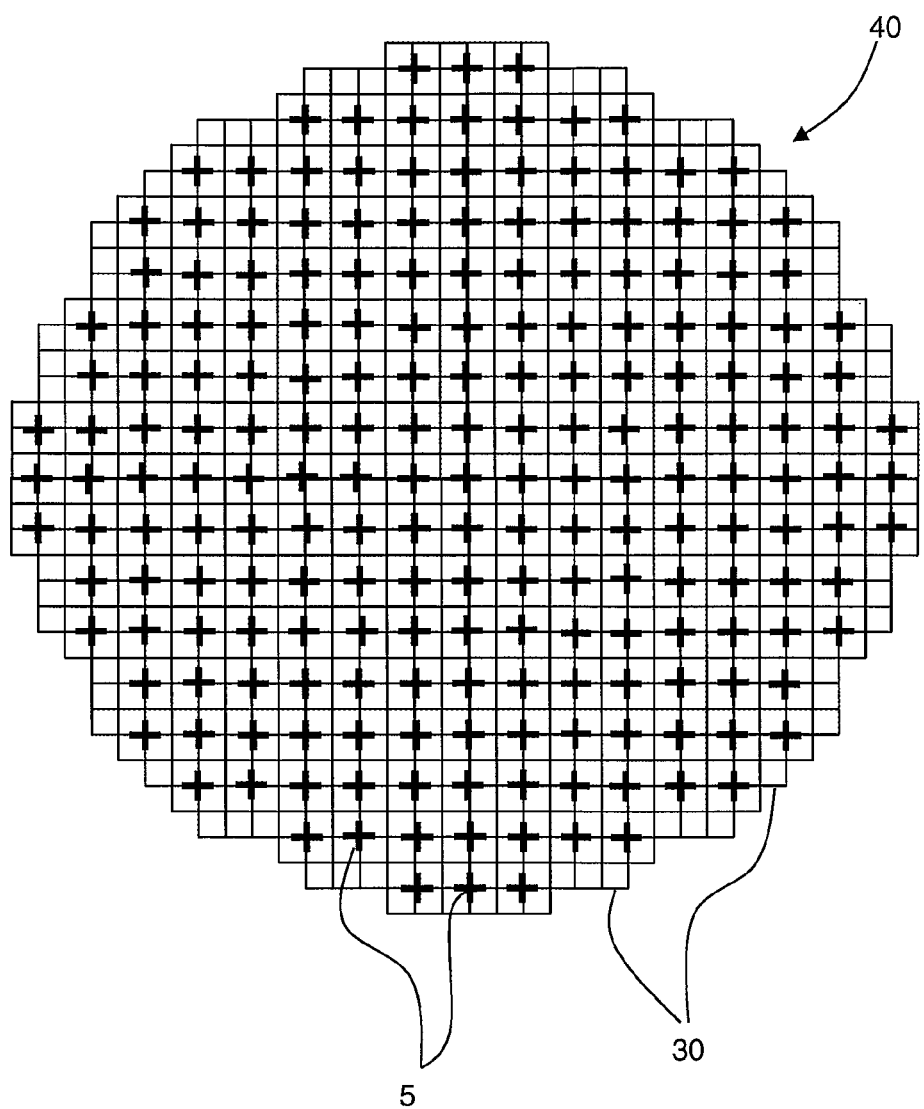
FIG. 1 is a plan view showing the configuration of the core of a light water reactor according to a first embodiment.

Embodiments of the present invention have been made to solve the above problems. Their object is to reduce the occurrence of minor actinides in a light water reactor.

According to an embodiment, there is provided light water reactor fuel assemblies each comprising: light water reactor fuel rods that extend longitudinally, contain nuclear fuel materials including enriched uranium, and are arranged parallel to each other; and burnable poison containing fuel rods that extend longitudinally, contain nuclear fuel materials whose main component is uranium that is lower in enrichment than the enriched uranium of the light water reactor fuel rods, and burnable poison, and are arranged in a lattice pattern together with the light water reactor fuel rods, wherein the assemblies are arranged parallel to each other and in a lattice pattern, an initial value of a first enrichment of the enriched uranium is set in such a way that the first enrichment of the enriched uranium at an end of each operation cycle is greater than a predetermined value.

According to another embodiment, there is provided a light water reactor fuel assembly production method comprising: a condition setting step of setting conditions at least concerning an operation cycle period and burnup; an enrichment setting step of setting an initial enrichment of enriched uranium; a burnup calculation step of calculating excess reactivity of a light water reactor core where light water reactor fuel assemblies including the enriched uranium are burned until an end stage of a final operation cycle; a determination step of determining whether a condition where excess reactivity at an end of a first operation cycle in the burnup calculation step is close to a predetermined positive value is true or not; and a decision step of returning to the enrichment setting step when it is determined at the determination step that the situation is not true, or of deciding an enrichment of the enriched uranium when it is determined that the situation is true.

According to another embodiment, there is provided a MOX fuel assembly production method comprising: a burnup step of burning light water reactor fuel assemblies in a light water reactor core until an end stage of a final operation cycle; an extraction and separation step of discharging the light water reactor fuel assemblies which have been burned at the burnup step, and extracting and isolating uranium through reprocessing, and obtaining extracted burned uranium; and a MOX fuel production step of mixing the extracted burned uranium and plutonium to produce mixed oxide fuel, wherein an enrichment of the extracted burned uranium is higher than an enrichment of uranium that is extracted and separated by reprocessing normal uranium fuel assemblies whose enrichment is set in such a way that excess reactivity at an end of each operation cycle comes to zero, and enrichment of plutonium that is to be mixed with the extracted burned uranium is therefore lower than enrichment of plutonium that should be mixed in a case of uranium that is extracted and separated by reprocessing the normal uranium fuel assemblies.

Hereinafter, with reference to the accompanying drawings, a light water reactor fuel assembly, a light water reactor core, and a MOX fuel assembly production method of the embodiments according to the present invention will be described. The same or similar portions are represented by the same reference symbols and will not be described repeatedly.

First Embodiment

FIG. 1 is a plan view showing the configuration of the core of a light water reactor according to a first embodiment. The light water reactor core 40 includes light water reactor fuel assemblies 30 and control rods 5. The case described below involves an example of BWR.

The light water reactor fuel assemblies 30 are arranged parallel to each other in a square lattice pattern. As a whole, the light water reactor fuel assemblies 30 form the shape of an almost circular light water reactor core 40. As for the light water reactor fuel assemblies 30, excluding those placed in the outer part of the light water reactor core 40, a set of four assemblies each constitutes a square cell of the lattice. At the center of each square cell of the lattice, a control rod 5 is placed in such a way that it can be inserted and pulled out. As described later, the number of light water reactor fuel assemblies 30 is set based on basic specifications such as the output power of the core. For example, in the case of advanced boiling water reactor (ABWR), there are 872 fuel assemblies, with the uranium metal mass per fuel assembly at 172 kilograms.

Figure 2:
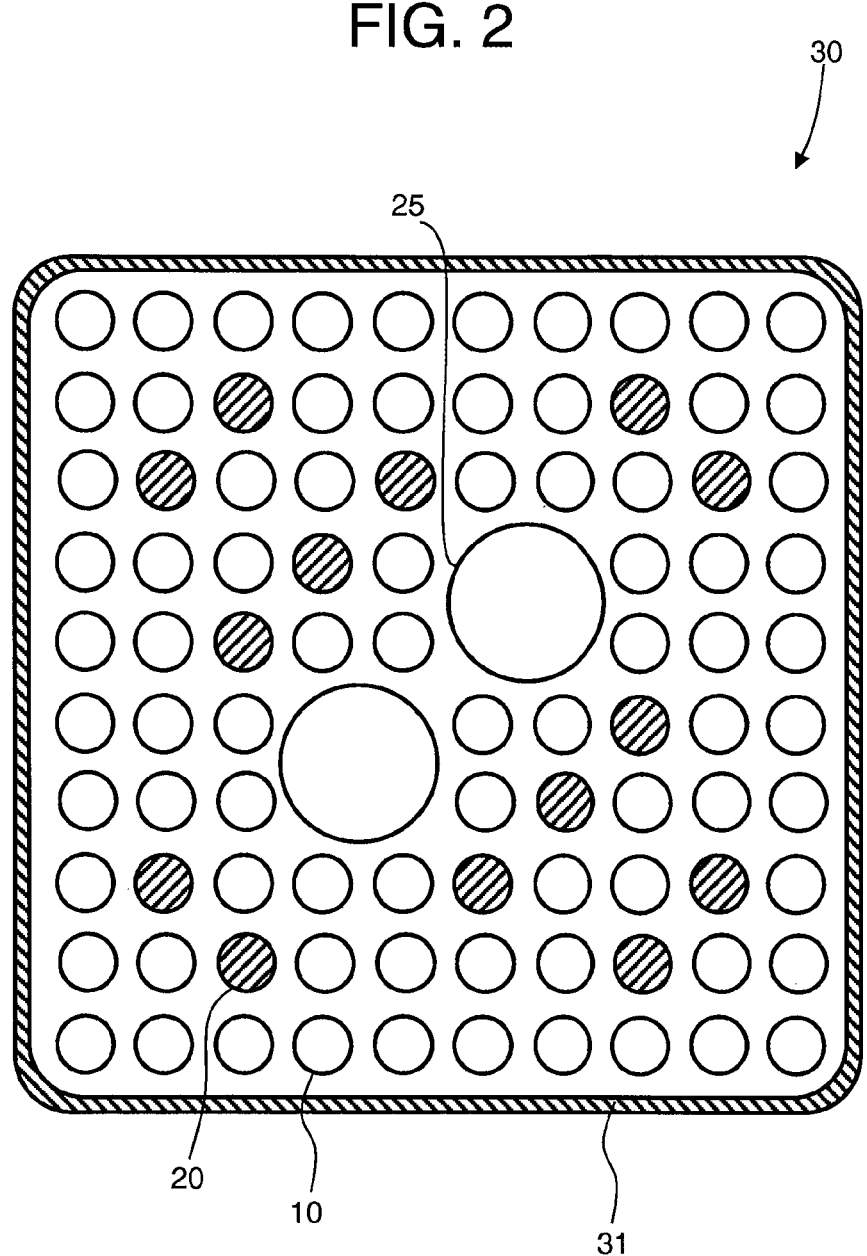
FIG. 2 is a cross-sectional view showing the configuration of a light water reactor fuel assembly according to the first embodiment.

FIG. 2 is a cross-sectional view showing the configuration of a light water reactor fuel assembly according to the first embodiment. The light water reactor fuel assembly 30 includes light water reactor fuel rods 10, burnable poison containing fuel rods 20, two water rods 25 and a channel box 31.

White Circles represent the light water reactor fuel rods 10, while shaded circles represent the burnable poison containing fuel rods 20. The light water reactor fuel rods 10 and the burnable poison containing fuel rods 20 are arranged parallel to one another in a lattice pattern. At the center of the array, the two water rods 25 are disposed through which coolant flows during operation. The lattice array has the shape of a quadratic prism whose cross-section is almost square, and is housed in the channel box 31, which is provided on the radially outer side thereof.

As a typical example of the light water fuel assembly, FIG. 2 shows the case where there are two hollow cylindrical water rods in a 10×10 arrangement. However, the present invention is not limited to this configuration. The arrangement number may be smaller or greater than that figure.

Moreover, the water rods may be tetragonal in cross-section. The number and arrangement of the burnable poison containing fuel rods 20 are not limited to those shown in FIG. 2.

The burnable poison containing fuel rods 20 contain burnable poison such as gadolinia or gadolinium oxide. The concentration of burnable poison is 4.0 percent, for example.

Figure 3:
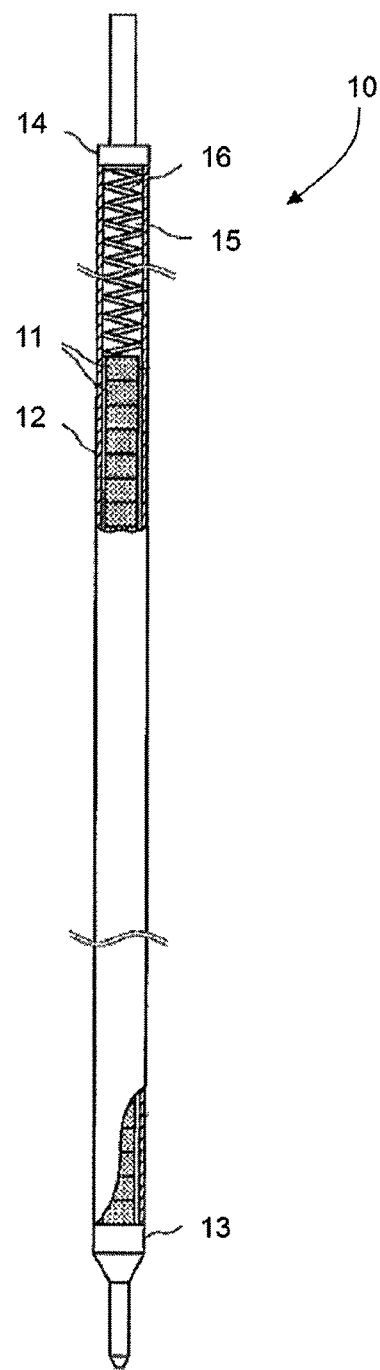
FIG. 3 is a partially cross-sectional elevational view showing the configuration of a light water reactor fuel rod according to the first embodiment.

FIG. 3 is a partially cross-sectional elevational view showing the configuration of a light water reactor fuel rod according to the first embodiment. The light water reactor fuel rod 10 includes fuel pellets 11 and a cladding tube 12 that houses the pellets. The lower end of the cladding tube 12 is closed by a lower end plug 13, and its upper end by an upper end plug 14. In this manner, the inside of the cladding tube 12 is sealed. In the case of BWR, the cladding tube 12 is made of zircaloy-2, for example. In the case of PWR, the tube is made of zircaloy-4, for example. The material of the cladding tube is not limited to those; Silicon carbide (SiC) may be used, for example.

The fuel pellets 11 are in the shape of a column and are made by sintering powdered uranium dioxides, for example. The fuel pellets 11 are stacked vertically. The degree of uranium enrichment is 5 percent on average in the fuel assemblies. Hereinafter, uranium enrichment refers to the degree of enrichment of uranium-235 in the kinds of uranium.

The fuel pellets 11 are not limited to uranium dioxide; uranium carbide or uranium nitride may be used. Above the fuel pellets 11 that are stacked vertically, an upper plenum 15 is formed so as to form a storage space for gases of fission products. Inside the upper plenum 15, a spring 16 is provided to press the fuel pellets 11 downwards.

FIG. 4 is a comparison table on specifications of the present embodiment and comparative example showing conventional techniques. Basically, the operation of the core in the present embodiment is similar to those of the comparative example or of conventional typical examples. That is, operation periods of the one operation cycle of the core each are 13 months, for example; the average burnup (average of fuel assemblies) at a time when the fuel assemblies are discharged from the core or average discharge burnup is 45 GWd/t, for example; the burnup at the end of the first operation cycle following the core loading of fuel assemblies is 10.4 GWd/t. Hereinafter, the fuel assemblies in comparative example, which are compared with the light water reactor fuel assemblies of the present embodiment, are referred to as normal uranium fuel assemblies for descriptive purposes.

The enrichment of normal uranium fuel assemblies is for example 3.8 percent on average in the assemblies. Meanwhile, the figure for the light water reactor fuel assemblies 30 of the present embodiment is 5.0 percent, higher than that for the normal uranium fuel assemblies. The concentration of burnable poison, however, is the same as that of the normal uranium fuel assemblies, at 4.0 percent, for example.

As described above, compared with the normal uranium fuel assemblies in the typical example of conventional techniques, the light water reactor fuel assemblies 30 of the present embodiment has an increased degree of enrichment of uranium fuel. In the example here, the enrichment of uranium is 5.0 percent. However, the present invention is not limited to that. As described later, as long as expected advantageous effects can be obtained, the enrichment may be higher or smaller than 5.0 percent.

The operation and other matters of the light water reactor fuel assemblies 30 and light water reactor core 40 of the present embodiment will be described below.

Figure 5:
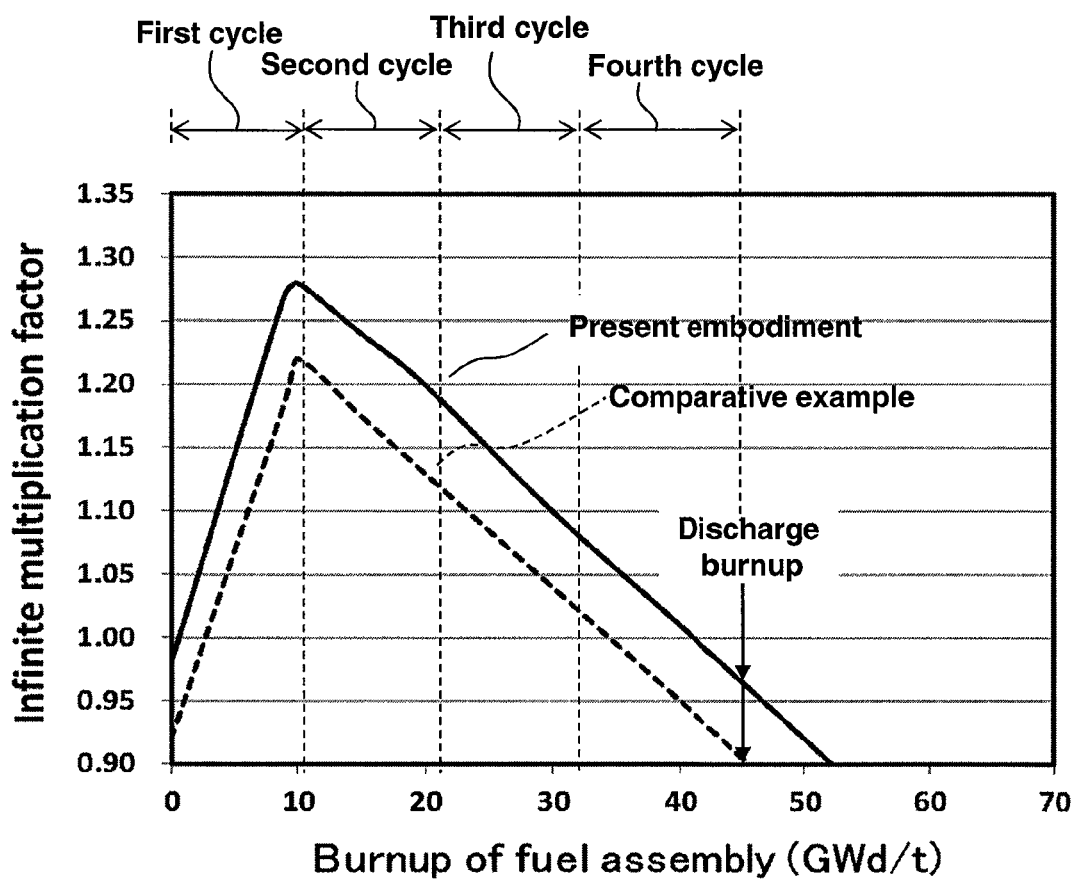
FIG. 5 is a graph concerning the light water reactor fuel assemblies of the first embodiment and the normal uranium fuel assemblies of the comparative example, showing a comparison of changes of the infinite multiplication factor in response to an increase in the burnup.

FIG. 5 is a graph concerning the light water reactor fuel assemblies of the first embodiment and the normal uranium fuel assemblies of the comparative example, showing a comparison of changes of the infinite multiplication factor depending on an increase in the burnup. The horizontal axis represents the burnup of each fuel assembly (GWd/t); 0 (GWd/t) represents the time when each fuel assembly is loaded in the reactor core. The vertical axis represents the infinite multiplication factor, k∞, per fuel assembly. The infinite multiplication factor is determined after such conditions as the fuel of each fuel assembly, and the material, composition and other factors of structural materials are determined. FIG. 5 shows the case where fuel assemblies are loaded into the core and exposed for four nuclear-reactor operation cycles inside the core and discharged from the core.

What is described first here is a comparative example of conventional fuel assemblies, shown by a broken line. As the burnup of fuel assemblies increases, in the first operation cycle, uranium-235, which is fissile material, is consumed, leading to a decrease in infinite multiplication factor k∞. However, burnable poison absorb neutrons, and are consumed and reduced. Moreover, among transuranic elements, fissile nuclides are generated. These factors significantly contribute to an increase in infinite multiplication factor k∞. As a result, infinite multiplication factor k∞ would increase and reaches up to about 1.22 at the end stage of the first operation cycle. That is, all the burnable poison are consumed by the end stage of the first operation cycle. In the second and subsequent operation cycles, among transuranic elements, fissile nuclides are generated. However, infinite multiplication factor k∞ would monotonically decrease as uranium-235, which is fissile material, is consumed.

FIG. 5 shows a change in infinite multiplication factor k∞ by focusing on one fuel assembly. However, in the core, there are fuel assemblies for the first operation cycle immediately after fuel-loading, fuel assemblies for the second operation cycle, fuel assemblies for the third operation cycle, and fuel assemblies for the fourth operation cycle as a final operation cycle. That is, there are fuel assemblies ranging in infinite multiplication factor k∞ from less than 1.0 to more than 1.0. As a result, in the core as a whole, a certain level of infinite multiplication factor k∞ that is greater than 1.0 is secured.

Determination of configuration of the entire core enables evaluations of those factors such as leakage of neutrons out of the core. Considering the infinite multiplication factor k∞ and those factors, effective multiplication factor keff is determined. As a result, in the state of all control rods being pulled out of the core in the case of BWR, or in the state of the boric acid concentration at zero in the case of PWR, the reactivity under that condition, or excess reactivity ρex, is conceptually calculated by the following equation (1):

$$\rho ex = (keff - 1)/keff \quad (1)$$

According to the conventional techniques shown in the comparative example, the degree of enrichment of each nuclear fuel assembly (average of fuel assemblies) is set in such a way that at the end stage of each of the first operation cycle to the fourth operation cycle in the case of FIG. 5 for example, excess reactivity ρex, expressed by the equation (1), comes as close to zero as possible. This enrichment is 3.8 percent, for example, as shown in FIG. 4.

What is described below is the case of the light water reactor fuel assemblies 30 of the present embodiment, shown by a solid line of FIG. 5. As shown in FIG. 4, the degree of uranium enrichment of the light water reactor fuel assemblies of the present embodiment is higher than the degree of uranium enrichment of the normal uranium fuel assemblies and is 5 percent in the example shown in FIG. 4. Since the enrichment is higher than that of the normal uranium fuel assemblies, as shown in FIG. 5, infinite multiplication factor k∞ in the present embodiment is up about 0.05 from the comparative example in the early phase of burning. As shown in FIG. 4, the concentration of burnable poison in the present embodiment is the same as in the comparative example. Therefore, as the burnup of the light water reactor fuel assemblies 30 increases, all the burnable poison are consumed by the end stage of the first operation cycle like in the comparative example, and infinite multiplication factor k∞ is maximized. In the second and subsequent operation cycles, uranium-235, which is fissile material, is consumed, leading to a decrease in infinite multiplication factor k∞.

Accordingly, at the end of the fourth operation cycle as the final operation cycle when the light water reactor fuel assemblies 30 are discharged from the light water reactor core 40, infinite multiplication factor k∞ is greater than in the comparative example. As a result, as can be seen based on the equation (1), excess reactivity ρex, too, is greater than in the conventional comparative example. That is, in the conventional case, excess reactivity ρex is as close to zero as possible, or is substantially zero; excess reactivity ρex in the present embodiment takes a positive number, such as 2% Δk.

As described above, if such conditions as operation period, average discharge burnup and refueling ratio are set to be identical to those in the comparative example, and if the operation is conducted with the initial uranium enrichment higher than that in the comparative example, the macroscopic fission cross-section and macroscopic neutron capture cross-section of uranium-235 in the fuel are being kept larger throughout burning than in the case of the comparative example. As a result, the fraction of neutrons absorbed by uranium-235 in the fuel increases. Moreover, the ratio of neutrons being absorbed by plutonium nuclides, which are original nuclides for minor actinides, or by minor actinide nuclides decreases. That is, it becomes more unlikely that plutonium or minor actinides are tuned into nuclides of a greater mass number. In this manner, the generation of minor actinides in spent fuel is kept lower than in the conventional case.

Figure 6:
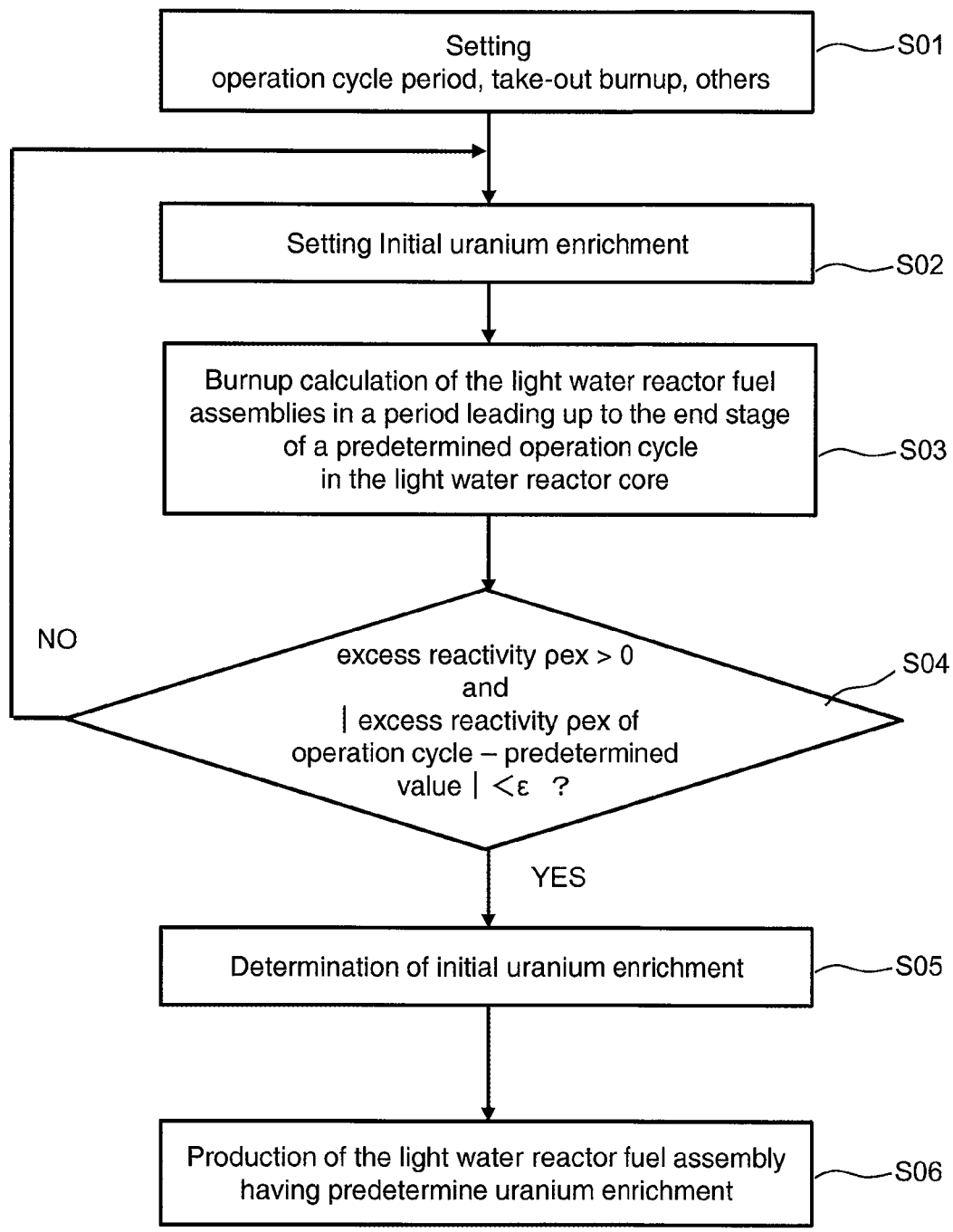
FIG. 6 is a flowchart mainly showing the procedure of a design method, a part of a light water reactor fuel assembly production method of the present embodiment.

FIG. 6 is a flowchart mainly showing the procedure of a design method, a part of a light water reactor fuel assembly production method of the present embodiment.

First, an operation cycle period, discharge burnup and other conditions are set (step S01). For example, one operation cycle is set at 13 months, the average discharge burnup of the assembly is set at 45 GWd/t, and other conditions are set.

Then, the initial uranium enrichment is set (Step S02). Based on this, the burnup calculation of the light water reactor fuel assemblies 30 in a period leading up to the end stage of a predetermined operation cycle in the light water reactor core 40 is performed (Step S03). Based on the results of the burnup calculation, a determination is made as to whether excess reactivity ρex throughout the operation cycle being positive, and whether excess reactivity ρex at the end stage of the operation cycle establishes the following formula (2) (Step S04):

$$|\text{Excess reactivity } \rho_{ex} \text{ of operation cycle end stage} - \text{predetermined value}| < \varepsilon \quad (2)$$

In this case, the predetermined value is a positive number and represents excess reactivity secured at the end stage of the operation cycle. Moreover, ε is a positive number small enough to determine whether both correspond to each other. An error between an analysis of excess reactivity by analysis and an actual machine is around 0.3% Δk or less. In the design analysis, configuring fuel elements and the core in such a way as to leave at least the excess reactivity of around 0.3% Δk or more is effective.

Accordingly, it is effective that the predetermined value is set at 2% Δk, for example, or at any other value greater than 0.3% Δk.

If it is determined that the formula (2) is not established (Step S04 NO), the settings of the initial uranium enrichment are revised at step S02, and step S03 and the following step are repeated.

If it is determined that the formula (2) is established (Step S04 YES), the initial uranium enrichment is determined (Step S05). Then, light water reactor fuel assemblies 30 having the determined uranium enrichment are produced (Step S06).

If the initial uranium enrichment is 3.8 percent as in the comparative example, the concentration of uranium-235 of the fuel assemblies discharged from the core is about 0.6 wt %, which is smaller than 1 wt %. It is known that in general, about 1 wt % of uranium-235 remains as described above in the spent fuel of light water reactor, if normal uranium fuel assemblies are designed in such a way that excess reactivity just comes to zero at the end of an operation cycle in accordance with the operation duration of one operation cycle.

Accordingly, in order to reduce minor actinides, instead of making the excess reactivity at the end of the operation cycle of the light water reactor core 40 greater than zero, the concentration of uranium-235 of the spent fuel in the core may be set greater than 1 wt %. That is, minor actinides can be reduced by setting initial uranium enrichment considering the burnup and operation conditions so that the concentration of uranium-235 of the spent fuel in the core is greater than 1 wt % at the end of one operation cycle.

The results of analyzing and evaluating the advantageous effects of the present embodiment using burnup Monte Carlo code MVP will be shown below along with the comparative example.

Figure 7:
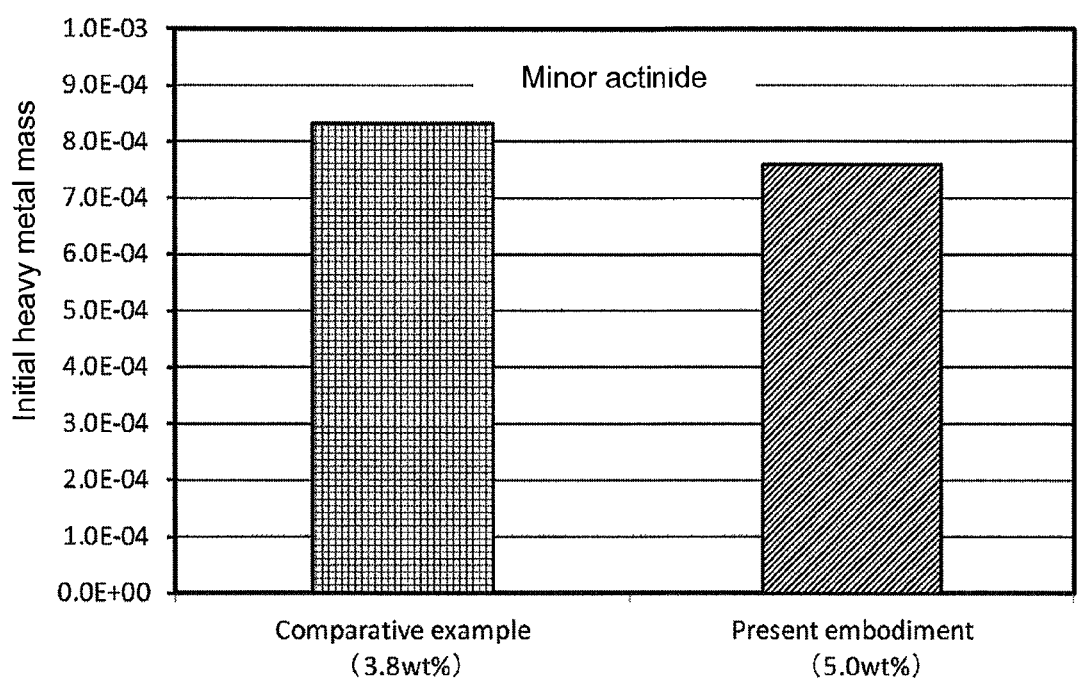
FIG. 7 is a graph concerning light water reactor fuel assemblies of the present embodiment and normal uranium fuel assemblies of the comparative example, showing a comparison in overall mass of minor actinides (MA) at the end stage of an operation cycle.

FIG. 7 is a graph concerning light water reactor fuel assemblies of the present embodiment and normal uranium fuel assemblies of the comparative example, showing a comparison in overall mass of minor actinides (MA) at the end stage of an operation cycle. The two cases are shown in bars aligned along the horizontal axis. The vertical axis represents the ratio (Pu) of overall mass of minor actinides (MA) at the end phase of an operation cycle in each case to the initial heavy metal mass.

In the example shown in FIG. 7, the ratio of mass of MA in the case of the present embodiment is 91 percent of the ratio of MA in the comparative example. That is, as a whole, the present embodiment keeps the generation of MA about 10 percent lower than the comparative example depending on the conventional techniques.

Figure 8:
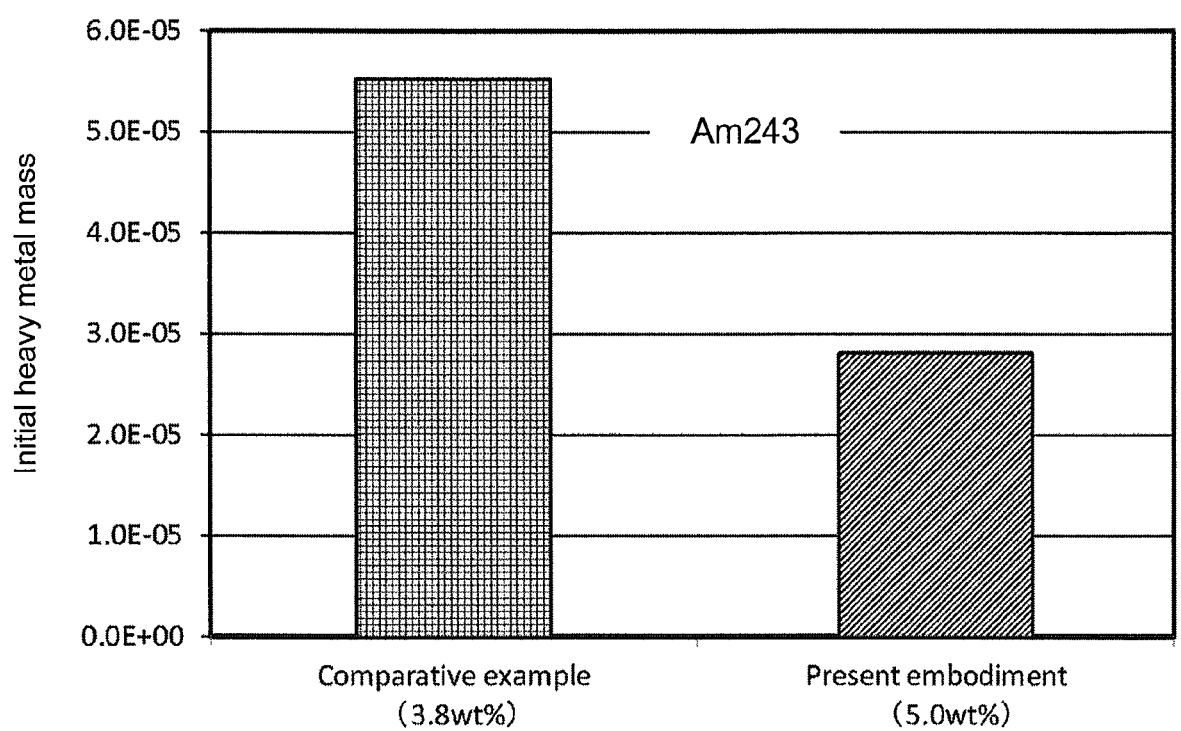
FIG. 8 is a graph showing a comparison in mass of Am243 at the end phase of an operation cycle.

FIG. 8 is a graph showing a comparison in mass of Am243 at the end phase of an operation cycle. Each case is plotted along the horizontal axis. The vertical axis represents the ratio (Pu) of mass of Am243 at the end phase of an operation cycle in each case to the initial heavy metal mass.

In the example shown in FIG. 8, the ratio of mass of Am243 is about 62 percent of the ratio of mass of the comparative example. Am243 is shown here as a typical example of MA, and is a nuclide that turns out to have a large presence in MA over the long term. This means that reducing this nuclide leads to a significant drop in potential radiotoxicity.

Figure 9:
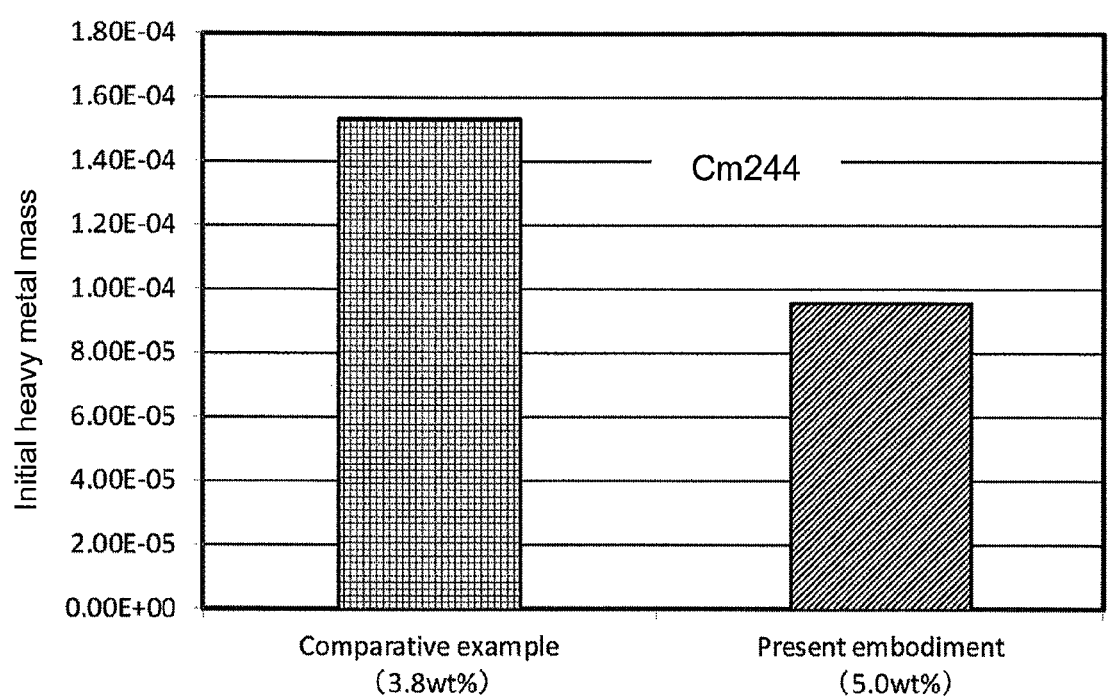
FIG. 9 is a graph concerning light water reactor fuel assemblies of the present embodiment and normal uranium fuel assemblies of the comparative example, showing a comparison in mass of Cm244 at the end stage of an operation cycle.

FIG. 9 is a graph concerning light water reactor fuel assemblies of the present embodiment and normal uranium fuel assemblies of the comparative example, showing a comparison in mass of Cm244 at the end stage of an operation cycle. The two cases are shown in bars aligned along the horizontal axis. The vertical axis represents the ratio (Pu) of mass of Cm244 at the end phase of an operation cycle in each case to the initial heavy metal mass.

In the example shown in FIG. 9, the ratio of mass of Cm244 in the case of the present embodiment is about 51 percent of the ratio of mass in the comparative example. That is, in the present embodiment, compared with the comparative example depending on the conventional techniques, the mass of Cm244 has been almost halved. Cm244 is shown here as a typical example of MA together with Am243, and is a nuclide that generates large amounts of neutrons and heat. This means that reducing this nuclide not only leads to a drop in potential radiotoxicity but also makes easier removal of heat during transportation to reprocessing and heat-removal measures at a reprocessing step.

Figure 10:
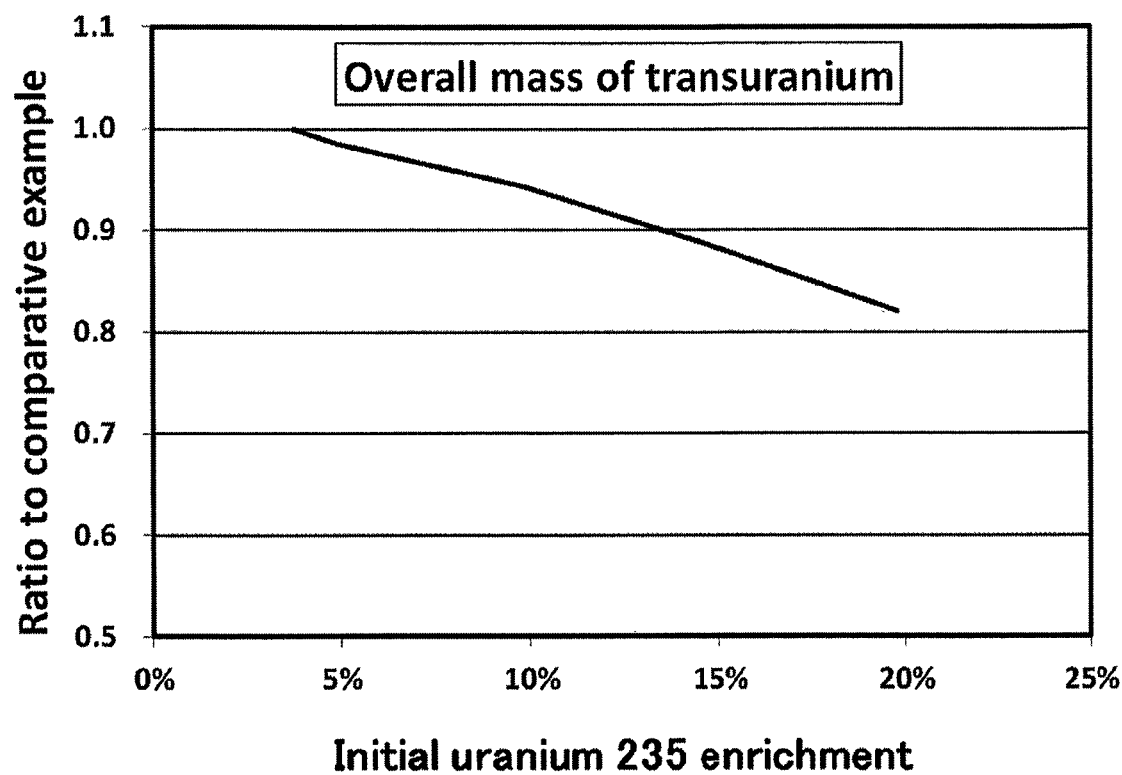
FIG. 10 is a graph showing dependent characteristics on the initial uranium enrichment, of the ratio of overall mass of transuranic elements at the end stage of an operation cycle of light water reactor fuel assemblies of the present embodiment to normal uranium fuel assemblies of the comparative example.

FIG. 10 is a graph showing dependent characteristics of the ratio of overall mass of transuranic elements to normal uranium fuel assemblies of the comparative example on the initial uranium enrichment at the end stage of an operation cycle of light water reactor fuel assemblies of the present embodiment.

As shown in FIG. 10, in the case where the initial uranium enrichment is changed from 3.8 percent in the comparative example depending on conventional techniques, to about 20 percent, the total amount of transuranic elements decreases accordingly. Specifically, if the degree of enrichment is set at 10 percent, the figure is about 0.94, down about 6 percent. If the degree of enrichment is at about 20 percent, the figure is about 0.82, marking an about 18 percent decline.

Figure 11:
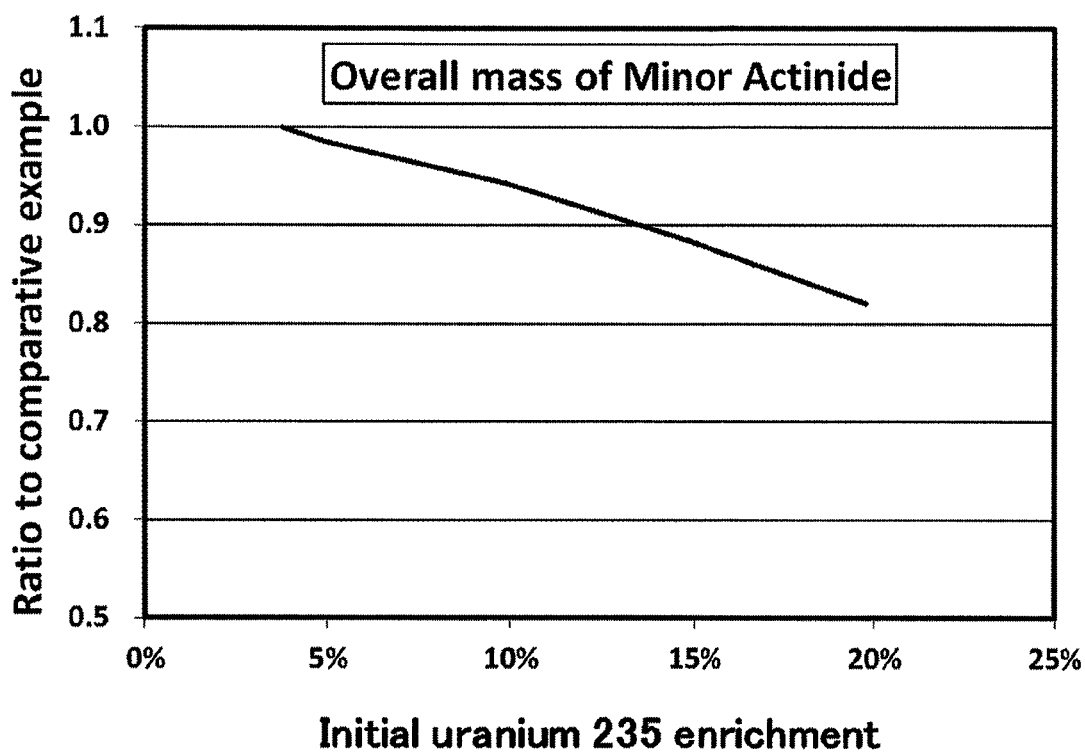
FIG. 11 is a graph showing dependent characteristics on the initial uranium enrichment, of the ratio of mass of all minor actinides at the end stage of an operation cycle of light water reactor fuel assemblies of the present embodiment to normal uranium fuel assemblies of the comparative example.

FIG. 11 is a graph showing dependent characteristics of the ratio of mass of all minor actinides on the initial uranium enrichment of the present embodiment to normal uranium fuel assemblies of the comparative example at the end stage of an operation cycle of light water reactor fuel assemblies.

As shown in FIG. 11, in the case where the initial uranium enrichment is changed from 3.8 percent in the comparative example depending on the conventional techniques, to about 20 percent, the total amount of minor actinides decreases accordingly, as described above. Specifically, if the initial uranium enrichment is set at 10 percent, the figure is about 0.76, down about 24 percent. If the degree of enrichment is at about 20 percent, the figure is about 0.63, marking an about 37 percent drop.

In this manner, as the initial uranium enrichment increases, the overall mass of transuranic elements and the total amount of minor actinides decrease in the same way, resulting in a significant drop in potential radiotoxicity.

As described above, as the initial uranium enrichment increases, the overall mass of transuranic elements and the total amount of minor actinides decline in the same way, resulting in a significant drop in potential radiotoxicity. Moreover, minor actinides decrease, and the minor actinides that will be subject to separation and conversion can therefore be reduced. As a result, it is possible to reduce partitioning-type reprocessing plants, which are required for the separation and conversion, fuel plants, which add minor actinides, or the capacity of a fast reactor. Therefore, it is possible to reduce their construction costs.

As described above, according to the present embodiment, as the initial enrichment becomes greater than in the comparative example, minor actinides in the spent fuel can be reduced.

Therefore, it is possible to reduce the potential radiotoxicity coming from minor actinides, without conducting the separation and conversion.

Second Embodiment

A second embodiment is an embodiment based on the first embodiment.

Figure 12:
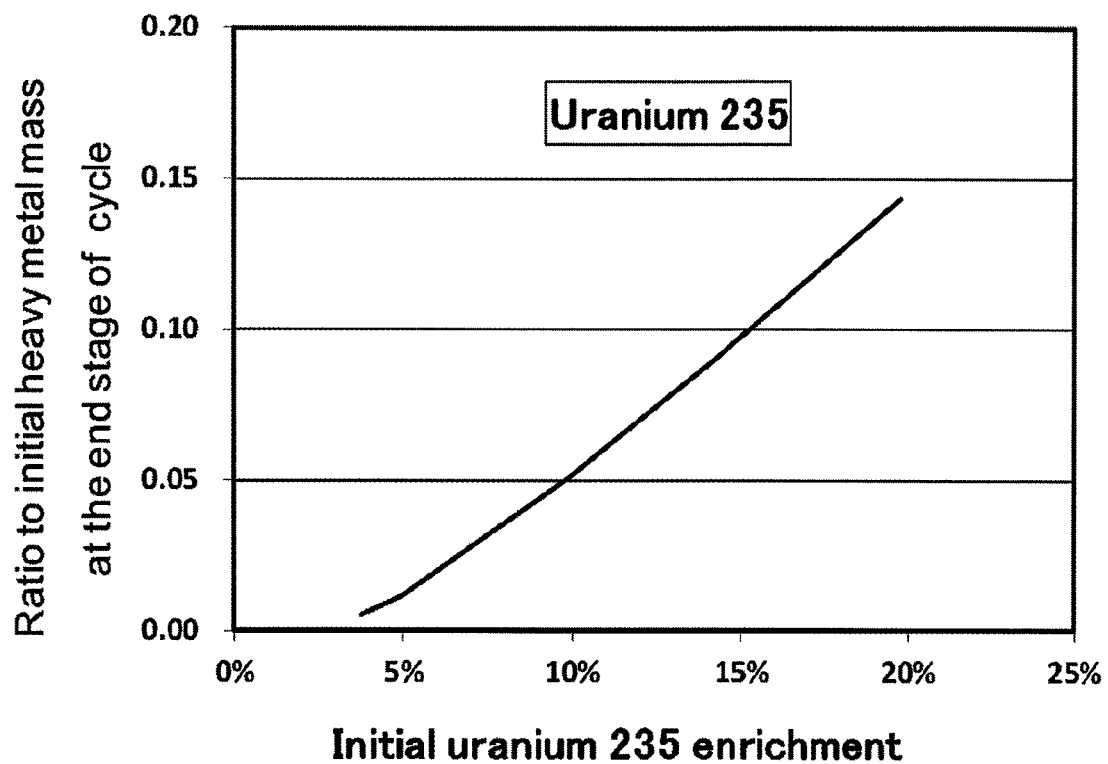
FIG. 12 is a graph showing dependent characteristics on the initial uranium enrichment, of the ratio of mass of uranium-235 at the end stage of an operation cycle of light water reactor fuel assemblies to the initial heavy metal mass.

FIG. 12 is a graph showing dependent characteristics: of the ratio of mass of uranium-235 of light water reactor fuel assemblies to the initial heavy metal mass at the end stage of an operation cycle; on the initial uranium enrichment. FIG. 12 shows the results of burnup calculation that the ratio of mass of uranium-235 at the end stage of an operation cycle to the initial heavy metal mass increases as the initial uranium enrichment increases. For example, when the initial uranium enrichment is 3.8 percent of the comparative example, the ratio of mass is about 0.006 or about 0.6 wt %, as described above. When the initial uranium enrichment is 10 percent, the ratio of mass is about 0.05 or about 5 wt %. When the initial uranium enrichment is 20 percent, the ratio of mass is about 0.15 or about 15 wt %.

Figure 13:
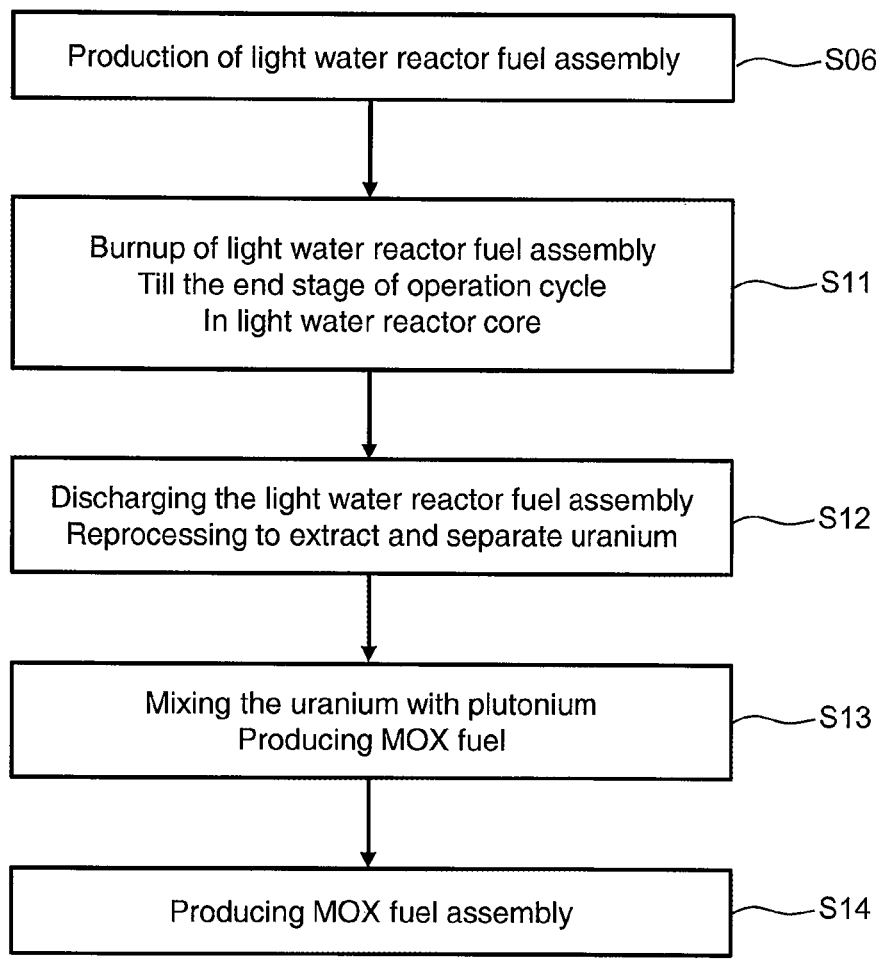
FIG. 13 is a flowchart showing the procedure of a MOX fuel assembly production method according to the second embodiment.

FIG. 13 is a flowchart showing the procedure of a MOX fuel assembly production method according to the second embodiment.

First, production of light water reactor fuel assemblies 30 is conducted (Step S06). Then, the light water reactor core 40 is loaded with the light water reactor fuel assemblies 30; till the end stage of its operation cycle, or in a period leading up to the end of the fourth operation cycle in the case of FIG. 5 for example, burnup takes place inside the light water reactor core 40 (Step S11).

The light water reactor fuel assemblies 30 are discharged from the light water reactor core 40 at the end stage of the operation cycle and are subject to reprocessing to extract and separate uranium (Step S12). In this case, the extracted uranium (extracted burned uranium) has a higher degree of residual uranium enrichment that depends on the high level of the initial enrichment than that of about 0.6 percent in the conventional comparative example.

Then, for example, that uranium is mixed with plutonium obtained from the reprocessing to make mixed oxide fuel (MOX fuel) (Step S13). Using this, a MOX fuel assembly is produced (Step S14). At this time, a higher degree of uranium enrichment allows the enrichment of fissile nuclides of to-be-mixed plutonium to remain low.

That is, compared with the usual case where depleted uranium (Uranium enrichment: 0.2 to 0.3 wt %), natural uranium (Uranium enrichment: 0.7 wt %), or uranium obtained from reprocessing of normal uranium fuel assemblies is used as the base material, the concentration of uranium-235 of extracted burned uranium is higher. This allows the enrichment of plutonium to be kept low.

In this manner, when light water reactor fuel is reprocessed to be used as MOX fuel, the uranium collected from the reprocessing is used in MOX fuel. Therefore, uranium-235 in the collected uranium does not have to be disposed of and is therefore utilized. Moreover, the enrichment of plutonium can be kept low, and the amount of transuranic elements therefore can be reduced.

As a result, it is possible to reduce the potential radiotoxicity resulting from minor actinides.

Moreover, it is possible to lessen the absolute value of a void coefficient (negative value) of a reactor that uses MOX fuel, such as a Pu-thermal reactor. Therefore, it is possible to mitigate the temporal response of transient events affected by the void fraction.

As described above, at the time of being not burned as fuel elements, in the mixed oxide fuel containing plutonium, the collected uranium that is obtained by reprocessing the spent fuel is used as the base material for MOX fuel. This enables residual uranium-235 to be effectively used.

Third Embodiment

FIG. 14 is a table of a comparison between specifications of light water reactor fuel assemblies of a third embodiment and those of normal uranium fuel assemblies of the comparative example. The present embodiment is a variant of the first embodiment. According to the first embodiment, the average uranium enrichment among the light water reactor fuel assemblies is higher than that of the normal uranium fuel assemblies. According to the present third embodiment, the degree of uranium enrichment among the light water reactor fuel assemblies 30 is higher than that of the normal uranium fuel assemblies, and the concentration of burnable poison, too, is higher. In the example shown in FIG. 14, the degree of uranium enrichment is 4.8 percent, and the concentration of burnable poison is 5.5 percent. In this manner, depending on the increased degree of uranium enrichment, the concentration of burnable poison is set higher.

Figure 15:
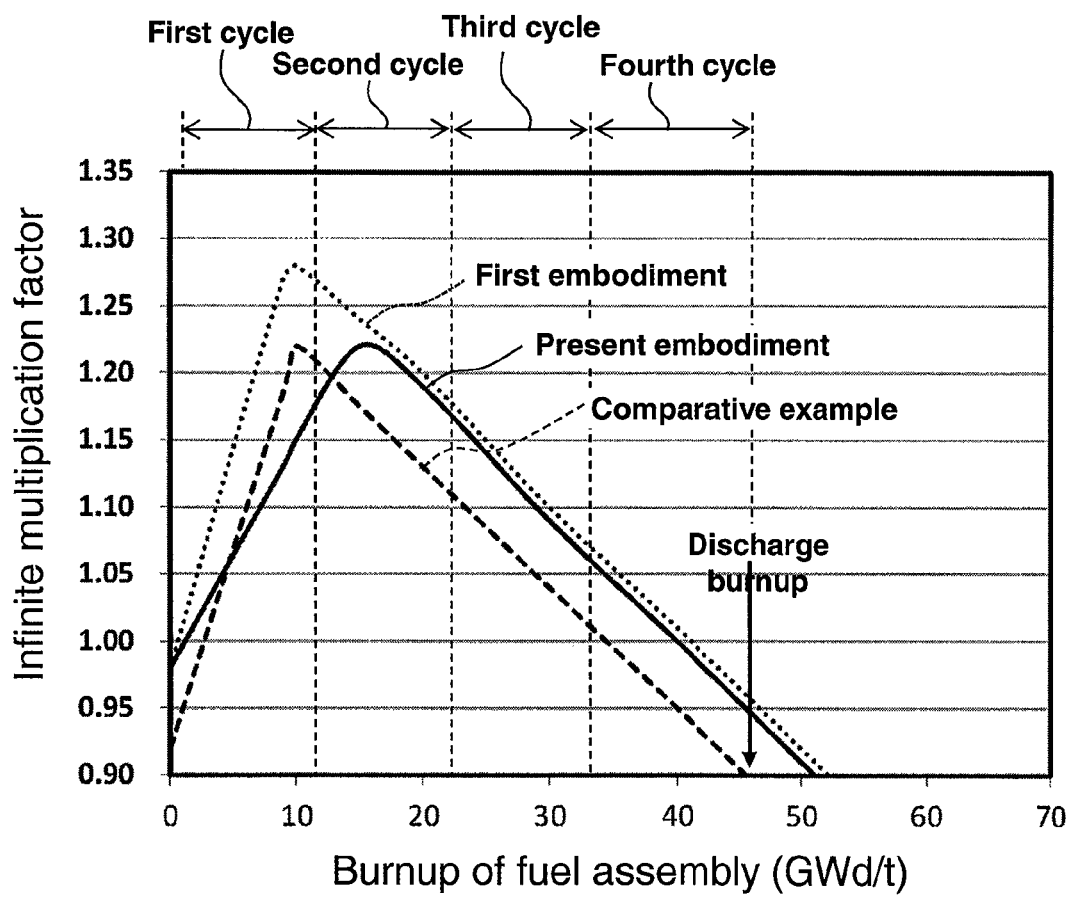
FIG. 15 is a graph concerning light water reactor fuel assemblies of the third embodiment and normal uranium fuel assemblies of the comparative example, showing a comparison between an increase in the burnup and a change in the infinite multiplication factor.

FIG. 15 is a graph concerning light water reactor fuel assemblies of the third embodiment and normal uranium fuel assemblies of the comparative example, showing a comparison of relation between an increase in the burnup and a change in the infinite multiplication factor. FIG. 15 is a result of adding the case of the third embodiment to FIG. 5. The comparative example described in the first embodiment is represented by a broken line, the first embodiment by a dotted line, and the present embodiment by a solid line.

In the case of the present embodiment represented by the solid line, when the burnup is 0 GWd/t, infinite multiplication factor $k\infty$ takes a similar value to that in the first embodiment. This is because the concentration of burnable poison is set higher than that in the first embodiment, and the number of fuel rods containing burnable poison is reduced in the present embodiment. In this case, the infinite multiplication factor $k\infty$ peaks at a middle point of the second operation cycle in time. That is, all the burnable poison are not consumed by the end of the first operation cycle, like in the comparative example or the first embodiment; the burnable poison still remain at the middle point of the second operation cycle. After the burnable poison is completely consumed, the infinite multiplication factor $k\infty$ monotonically decreases, as in the comparative example or the first embodiment. At this time, the peak value of the infinite multiplication factor $k\infty$ is almost equal to the peak value of the infinite multiplication factor $k\infty$ of the comparative example.

In this manner, according to the present embodiment, as in the first embodiment, uranium enrichment is increased, and the concentration of burnable poison is raised. As a result, like the first embodiment, the peak value of the infinite multiplication factor $k\infty$ does not rise compared with the conventional example, and instead stays within a range of values similar to those in the conventional example. For example, even in the case where new fuel is handled, management may be done on the assumption that there is a peak value of infinite multiplication factor $k\infty$ that is of the case of exposure in the reactor. Even with such a management method, the light water reactor fuel assemblies 30 of the present embodiment can be handled under management similar to the conventional one.

As the value of infinite multiplication factor $k\infty$ at the end stage of the first operation cycle becomes smaller, the excess reactivity of the core at the end stage of each operation cycle is lower than in the first embodiment. The concentration of burnable poison can be made smaller than in the examples as long as it is in a permissible range of power peaking of assemblies of the core. In such a case, the excess reactivity at the end stage of each operation cycle increases accordingly.

Other Embodiments

While embodiments of the present invention have been described, these embodiments have been presented by way of example only, and are not intended to limit the scope of the invention.

For example, the embodiments show examples of a BWR. However, the present invention is not limited to this. The light water reactor may be a PWR. Moreover, the embodiments show the cases of uranium fuel. The present invention is also applicable when mixed oxide fuel (MOX fuel) is used.

The embodiments described above may be combined in any possible ways. Further, the embodiments described above may be reduced to practice in various configurations. Various omissions, replacements and changes can be made, without departing from the scope and gist of the invention. The accompanying claims and their equivalents are intended to cover such forms or modifications as would fall within the scope and spirit of this invention.

What is claimed is:

1. A method of producing a light water reactor fuel assembly, comprising:
   setting conditions at least concerning an operation cycle period and average discharge burnup;
   setting an initial enrichment of enriched uranium to 5% or more;
   calculating excess reactivity of a light water reactor core where light water reactor fuel assemblies including the enriched uranium are burned until an end stage of a final operation cycle;
   determining whether excess reactivity is positive through the operation cycle and 0.3% Δk at an end of a first operation cycle in the calculating of the excess reactivity;
   returning to the setting of the initial enrichment, if the determining determines that the excess reactivity is not positive and 0.3% Δk, or deciding an enrichment of the enriched uranium if the determining determines that the excess reactivity is positive and 0.3% Δk; and
   placing the enriched uranium determined in the determining to have the excess reactivity that is positive and 0.3% Δk as fuel pellets into a cladding tube configured to house the enriched uranium pellets, the cladding tube being configured as a LWR fuel rod suitable for in the light water reactor fuel assembly in an array of LWR fuel rods and burnable poison-containing fuel rods.

2. The method of claim 1, further comprising:
   assembling the light water reactor fuel assembly using the enriched uranium,
   wherein the light water reactor fuel assembly comprises:
   a plurality of the LWR fuel rods, wherein the fuel pellets in each of the LWR fuel rods comprise a first uranium enriched to a first value, and the first uranium in the fuel pellets is present in the form of uranium dioxide, uranium carbide, or uranium nitride; and a plurality of the burnable poison-containing fuel rods comprising a burnable poison and a second uranium enriched to a second value, wherein the first value is greater than the second value, wherein the LWR fuel rods extend longitudinally and are arranged parallel to each other, wherein the burnable poison-containing fuel rods extend longitudinally and are arranged in a lattice pattern together with the LWR fuel rods, wherein the plurality of fuel assemblies are arranged parallel to each other and in a lattice pattern, wherein each of the LWR fuel rods has the enriched uranium at the initial enrichment, resulting the excess reactivity of the light water reactor core being positive at the end of a first operation cycle, and wherein burnable poison in the burnable poison-containing fuel rods at least partially remains at a middle point of a second operation cycle.

3. The method of claim 1, further comprising:
setting the initial enrichment of the enriched uranium for the fuel assembly higher than a normal-type initial uranium enrichment value in a normal-type uranium fuel assembly comprising burnable poison-containing fuel rods; and setting the uranium enrichment value in the normal-type uranium fuel assembly in such a way that excess reactivity at an end of an operation cycle comes to zero.

4. The method of claim 1, wherein a concentration of the burnable poison contained in each of the burnable poison-containing fuel rods in the fuel assemblies is higher than a concentration of the burnable poison contained in each of fuel rods in the normal-type uranium fuel assemblies.

5. The method of claim 1, further comprising:
arranging a plurality of the LWR fuel rods to extend longitudinally and parallel to each other in an array.

6. The method of claim 5, further comprising:
arranging a plurality of the burnable poison-containing fuel rods to extend longitudinally and in a lattice pattern together with the LWR fuel rods.

* * * * *